July 4, 1961 M. ESCHMANN 2,991,136
INJECTION SYRINGE
Filed Feb. 1, 1960
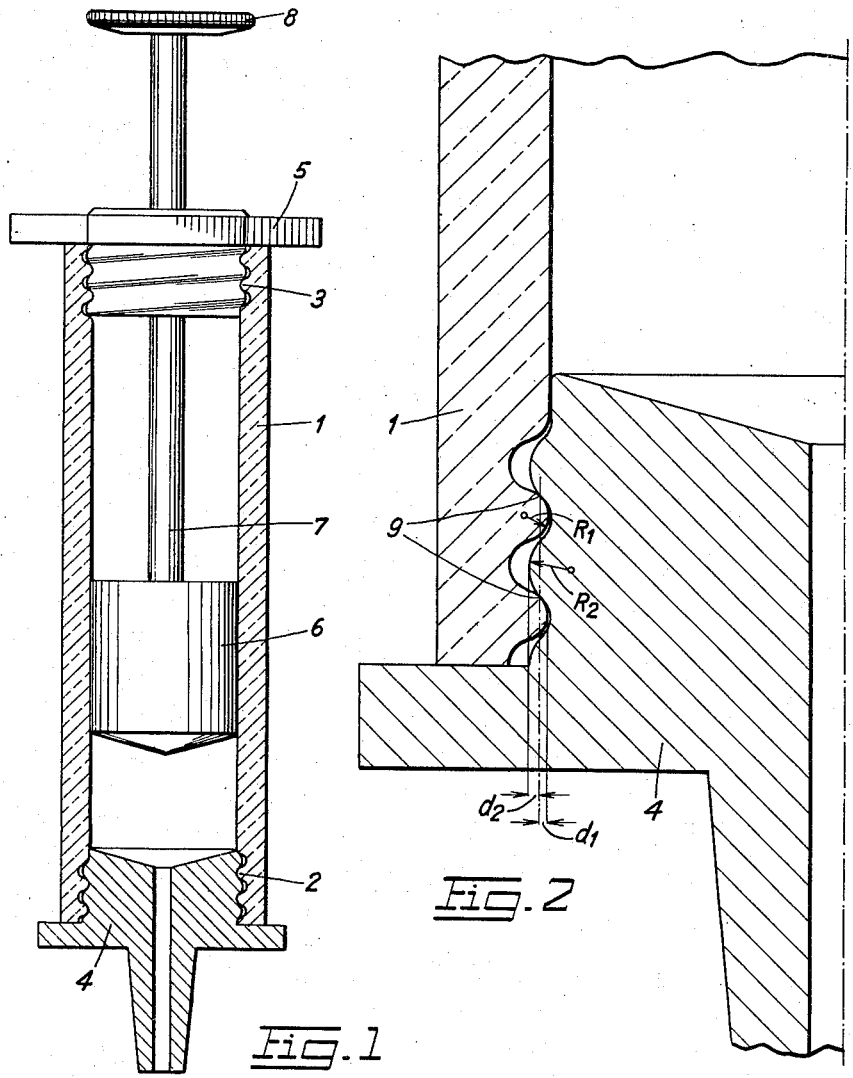
INVENTOR
Max Eschmann

United States Patent Office 2,991,136
Patented July 4, 1961

2,991,136
INJECTION SYRINGE
Max Eschmann, Hallwylstrasse, Murten, Fribourg, Switzerland
Filed Feb. 1, 1960, Ser. No. 6,051
Claims priority, application Switzerland May 28, 1959
7 Claims. (Cl. 309—2)

This invention relates in general to new and useful improvements in the field of injection syringes, and more particularly relates to the provision of a novel connection between a glass cylinder and a metal end fitting.

A critical problem in connection with injection syringes of the type having a glass cylinder and at least one metal end fitting, is that it must be possible to break down the injection syringe into its glass and metal parts for the purpose of a thorough cleaning and at the same time, be able to sterilize the injection syringe without it being absolutely necessary to break down the syringe.

While upon initial consideration, this would not appear to present a problem, the difficulty resides in the different coefficients of expansion of the glass cylinder and the metal end fittings. While it has been possible to form threads on both the glass cylinder and the metal fitting, up until the present time, when the glass cylinder and the metal fitting have been retained together as a unit and the syringe heated in the assembled condition to a sterilizing temperature of about 200 degrees C., there has been the danger of breaking, or at least damaging the glass cylinder of the syringe.

At the present time, syringes have been constructed wherein the cylinder is of glass and the fittings are formed of metal. However, the glass cylinder and the metal fittings are cemented together and cannot be taken apart for purposes of cleaning. In addition, although such syringes can be sterilized in the assembled state, the cement, being a porous material, becomes fully saturated with the injection liquid, and with the passage of time, becomes brittle and crumbles off, eventually resulting in a destruction of the required seal between the glass cylinder and the metal fitting.

Also, in relatively expensive injection syringes, metal fittings have been assembled on glass cylinders in such a manner that the syringes could be taken apart for cleaning. These syringes were constructed with special metal fittings connected to the glass cylinder and the end fittings were, in turn, connected to the special fittings. These syringes could be taken apart for cleaning, but could not be sterilized in the assembled state without danger of damaging the glass cylinder. Furthermore, because of their expense, they were not suitable for mass production techniques, as required today. Finally, it was proposed to screw the cylinder directly to the metal fitting. However, attempts in this direction have not been satisfactory since, upon sterilization without first taking the syringe apart, the glass cylinder broke in most cases. In order to remedy this drawback, it was further attempted to replace the glass cylinder by a plastic cylinder, which plastic, however, was not satisfactory either in manufacture or from the standpoint of a glass-clear transparency of the cylinder. Also, the tightness of such a cylinder construction was not that obtainable with glass.

In view of the foregoing, it is the primary object of the present invention to create a cheap injection syringe having a glass cylinder and at least one metal fitting which can be taken apart for cleaning and at the same time which may be readily sterilized without danger in the assembled state.

In accordance with the present invention, it is proposed to provide in a syringe construction a glass cylinder having metal end fittings at the opposite ends thereof, the metal end fittings being screwed onto the ends of the glass cylinder utilizing a thread which will permit the desired expansion of the glass cylinder and the metal fitting without subjecting the glass cylinder to breakage.

In attempting to solve the undesired expansion problem of connecting metal fittings to glass cylinders in syringes wherein the assembly may be subjected to high temperatures during the sterilization of the syringe, it has been found that the solution resides in the formation of a special thread. The thread must be of a nature to permit the fitting to be tightened down on the glass cylinder to provide a seal between the two, and at the same time, provide sufficient clearance for the expansion of the materials of the syringe. In accordance with the invention, it is proposed to use a round thread, with the thread of the fitting and the thread of the glass cylinder lying one on top of the other in the region of their rounding and tightly screwed together.

A further object of the invention is to provide a novel thread construction for use in securing metal fittings to glass cylinders through a threaded connection in such a manner that the two may be heated to a sterilization temperature without the effect of expansion damaging the glass cylinder, the thread being a rounded thread with the thread of the innermost part being relatively flat as compared to the thread of the outermost part and there being only a limited contact between the two threads when the parts are secured together so that sufficient room is left available for the expansion of the metal and glass components.

Still another object of the invention is to provide a glass cylinder which can be heated, screwed to metal fittings, and at the same time, retain its elasticity properties so that the heating of the glass cylinder and the metal fittings secured together as a unit will not result in the fracture of the glass cylinder, the glass cylinder being formed without the usual after-working, such as being after-ground, so that the glass retains a sufficient elasticity at the sterilization temperature for the glass to eliminate the internal stressing of the glass and the breaking thereof.

With the above, and other objects in view that will hereinafter appear, the nature of the invention will be more clearly understood by reference to the following detailed description, the appended claims, and the several views illustrated in the accompanying drawing.

In the drawing:

FIGURE 1 is an axial sectional view taken through an injection syringe formed in accordance with the invention.

FIGURE 2 is an enlarged fragmentary axial view taken through the lower portion of the syringe, and shows the specific details of the thread connection between a lower metal fitting and the lower end of the glass cylinder.

Referring now to the drawing in detail, it will be seen that an example embodiment of the invention is best illustrated in FIGURE 1. The injection syringe illustrated in FIGURE 1 includes an elongated glass cylinder 1 which is provided at its two ends with internal threads 2 and 3, respectively. Metal fittings are threadedly connected to opposite ends of the glass cylinder 1. These metal fittings include a needle adapter 4 and a cover 5. The metal fittings 4 and 5 are provided with external threads which are engaged with the internal threads 2 and 3, respectively, of the glass cylinder 1.

The cover 1 is provided with a bore (not shown) therethrough through which there passes a plunger rod 7 bearing a plunger 6, the outer end of the plunger rod 7 being provided with an operating knob 8 to facilitate the reciprocation of the plunger 6 within the glass cylinder.

The novelty of the invention resides in the formation of the threads on the two metal fittings 4 and 5, and the formation of the threads 2 and 3 of the glass cylinder 1. It is necessary that the threads form a connection between the glass cylinder and the metal fittings of a nature that does not loosen even after sterilization and at the same time, permits a sufficient amount of relative motion which is caused by the difference in coefficient of expansion between the metal fittings and the glass cylinder when the components are heated to sterilization temperatures, so that there is not the slightest danger of breaking the glass cylinder, or even merely damaging the glass cylinder.

The first requirement of the threads is that the threads be developed as round threads, as is best illustrated in FIGURE 2. The dimensions of the threads have been selected so that the thread of the individual metal fitting, for example the metal fitting 4 of FIGURE 2, and the thread of the glass cylinder 1, when tightly squeezed together, rest on each other in the region of their outer rounding or peaks, as is clearly shown in FIGURE 2. Extensive tests have proven that round threads of this type sufficiently permit the required relative movement, which movement is accomplished by the fact that the threads, when tightly screwed together, contact not along a surface as in the case of normal threads, but only along a line, which line is represented in section in FIGURE 2 as passing through contact points 9. Furthermore, the dimensions of the threads are such that the helix along which the external threads of the fitting and the internal thread of the glass cylinder contact when they are tightly screwed together is displaced towards the outside upon an axial relative movement of the cylinder and the metal fitting, this being made possible by an elastic deformation of one of the threads. When this happens, the tangential plane of the thread through the line of contact upon increase in the relative motion assumes a smaller and smaller angle with respect to the geometric axis of the injection syringe, whereby the resistance in opposition to such relative movement constantly decreases.

These conditions are best met if the line of contact between the threads lies close to the apices of the screw threads when in the cold condition. Referring to FIGURE 2, the distances $d_1$ and $d_2$ are small without being so small that upon a relative movement such as that possible by the elastic deformation of one of the threads, the threads come out of contact with each other. This prerequisite can be established in a relatively simple manner by making the radii $R_1$ and $R_2$ of the outer roundings of the two threads of different dimensions, in which case the line of contact is shifted toward the apex of the threads.

Furthermore, the displacement of the line of contact toward the outside results in a considerably easier elastic deformation of one of the threads, this deformation representing one of the prerequisites for the desired relative movement between the glass cylinder and the fittings, as occurs when the fittings and the glass cylinder are heated due to the differential in coefficient of expansion thereof.

A further effect of the difference in the radii $R_1$ and $R_2$ is the reduction of the thread engagement so that sufficient room remains free for the working out of the external thread of the metal fitting at right angles to the axis of the syringe, when the syringe is heated to a relatively high temperature.

At this time, it is pointed out that the threads of the glass cylinder are relatively deep as compared to the threads of the metal fittings, and the spacing between the threads of the glass cylinder is greater than the spacing between the threads of the metal fittings.

The second requirement of the thread components is that the elastic properties of the glass not be impaired so that the metal fittings and the glass cylinder can be heated, while screwed together, to sterilization temperatures in the vicinity of 200 degrees C. It is known that the elasticity properties of glass are impaired when the glass is after-worked, for instance, being after-ground. The desired elastic deformation of the internal threads of the glass cylinder 1 can, accordingly, be obtained only with unground glass cylinders.

Summarizing, it has been found that if aftertreatment of the glass cylinder is dispensed with, and in accordance with modern known methods the glass cylinder can today be produced with more than sufficient accuracy even without after-working, the glass has such an elasticity at the temperatures in question that there is no danger of breaking upon heating the assembled syringe to the temperature in question, that is, a sterilization temperature of 200 degrees C., when sufficient relative motion between the glass and the metal fittings has been made possible by the proper development of the threads, as described above.

Under the foregoing two conditions, it is possible to connect a metal fitting with a glass cylinder of an injection syringe by simply screwing together the two parts to create a syringe which can be taken apart for cleaning in a very simple manner, but which on the other hand definitely permits sterilization in the assembled state without danger of breakage or damage. In addition to this, such a syringe is extremely cheap to manufacture.

From the foregoing, it will be seen that novel and advantageous provision has been made for carrying out the desired end. However, attention is directed to the fact that variations may be made in the example method and structure disclosed herein without departing from the spirit and scope of the invention, as defined in the appended claims.

What is claimed as new:

1. In an injection syringe, a glass cylinder and a metal fitting on at least one end of said glass cylinder, said fitting and said cylinder being releasably connected together by a threaded connection including threads on said glass cylinder and said metal fitting, said threads having rounded peaks in contact with each other, said threads being in contact with each other along their respective peaks only and thus providing space to accommodate for the axial and radial unequal expansion of the glass cylinder and the metal fitting when heated as a unit to a sterilization temperature by sliding movement of the peaks on each other.

2. In an injection syringe, a glass cylinder and a metal fitting on at least one end of said glass cylinder, said fitting and said cylinder being releasably connected together by a threaded connection including threads on said glass cylinder and said metal fitting, said threads having rounded peaks in contact with each other, said threads being in contact with each other along their respective peaks only and thus providing space to accommodate for the axial and radial unequal expansion of the glass cylinder and the metal fitting when heated as a unit to a sterilization temperature by sliding movement of the peaks on each other, the radius of the rounded peak of one of said threads being different from the radius of the rounded peak of the other of said threads.

3. The injection syringe of claim 2 wherein the thread having the smaller radius rounded peak is deeper than the thread having the larger radius rounded peak.

4. The injection syringe of claim 2 wherein the spacing between the thread having the smaller radius rounded peak is greater than the spacing between the thread having the larger radius rounded peak.

5. The injection syringe of claim 2 wherein the thread having the smaller radius rounded peak is deeper than the thread having the larger radius rounded peak, the spacing between the thread having the smaller radius rounded peak being greater than the spacing between the thread having the larger radius rounded peak.

6. In an injection syringe, a glass cylinder and a metal fitting on at least one end of said glass cylinder, said fitting and said cylinder being releasably connected together by a threaded connection including threads on said glass cylinder and said metal fitting, said threads having rounded peaks in contact with each other, said threads being in contact with each other along their respective peaks only and thus providing space to accommodate for the unequal expansion of the glass cylinder and the metal fitting when heated as a unit to a sterilization temperature by sliding movement of the peaks on each other, the radius of the rounded peak of said glass threads being less than the radius of the rounded peak of said metal threads.

7. The injection syringe of claim 6 wherein the thread having the smaller radius rounded peak is deeper than the thread having the larger radius rounded peak, the spacing between the thread having the smaller radius rounded peak being greater than the spacing between the thread having the larger radius rounded peak.

References Cited in the file of this patent

UNITED STATES PATENTS 2,711,171     Dunnican              June 21, 1955